United States Patent [19]

Carignani et al.

[11] 4,370,425

[45] Jan. 25, 1983

[54] PROCESS FOR OBTAINING PERMANENTLY SELF-EXTINGUISHING CELLULAR MATERIALS WHICH HAVE A LOW DENSITY AND HIGH MECHANICAL CHARACTERISTICS

[75] Inventors: Giancarlo Carignani, Roma; Aldo Cipriani, Colleferro, both of Italy

[73] Assignee: Shia Viscosa Societa Nazionale Industria Applicazioni Viscosa S.p.A., Milan, Italy

[21] Appl. No.: 204,254

[22] Filed: Nov. 5, 1980

[30] Foreign Application Priority Data

Nov. 20, 1979 [IT] Italy .................. 27441 A/79

[51] Int. Cl.³ .................. C08V 9/30; C08L 67/00
[52] U.S. Cl. .................. 521/138; 521/132; 521/92; 521/123; 521/182; 521/907
[58] Field of Search .................. 521/132, 182, 138, 907

[56] References Cited

U.S. PATENT DOCUMENTS

| | | | |
|---|---|---|---|
| 2,931,746 | 4/1960 | Robitschek et al. | 521/182 |
| 3,131,115 | 4/1964 | Robitschek et al. | 521/182 |
| 3,260,688 | 7/1966 | Watanabe et al. | 521/182 |
| 3,362,919 | 1/1968 | Rood | 521/182 |
| 3,882,055 | 5/1975 | Koerner et al. | 521/182 |

*Primary Examiner*—Morton Foelak
*Attorney, Agent, or Firm*—Wenderoth, Lind & Ponack

[57] ABSTRACT

Process for the preparation of permanently self-extinguishing cellular materials essentially comprising brominated unsaturated polyester resins, containing conventional additives, having a density comprised between 300 and 700 g/l correlated to a resistance to compression, as of a formed product, higher than the curve shown in the attached FIG. 1, said process being characterized by the fact that a brominated unsaturated polyester resin, containing an amount of bound bromine comprised between 10 and 30%, preferably between 12 and 25% by weight, containing conventional additives, is subjected to foaming by mechanical incorporation therein of a gas or a gas mixture, until crosslinkable liquid foams are obtained, which latter are subsequently subjected to crosslinking by conventional methods. The present invention further refers to permanently self-extinguishing cellular materials thus obtained.

6 Claims, 1 Drawing Figure

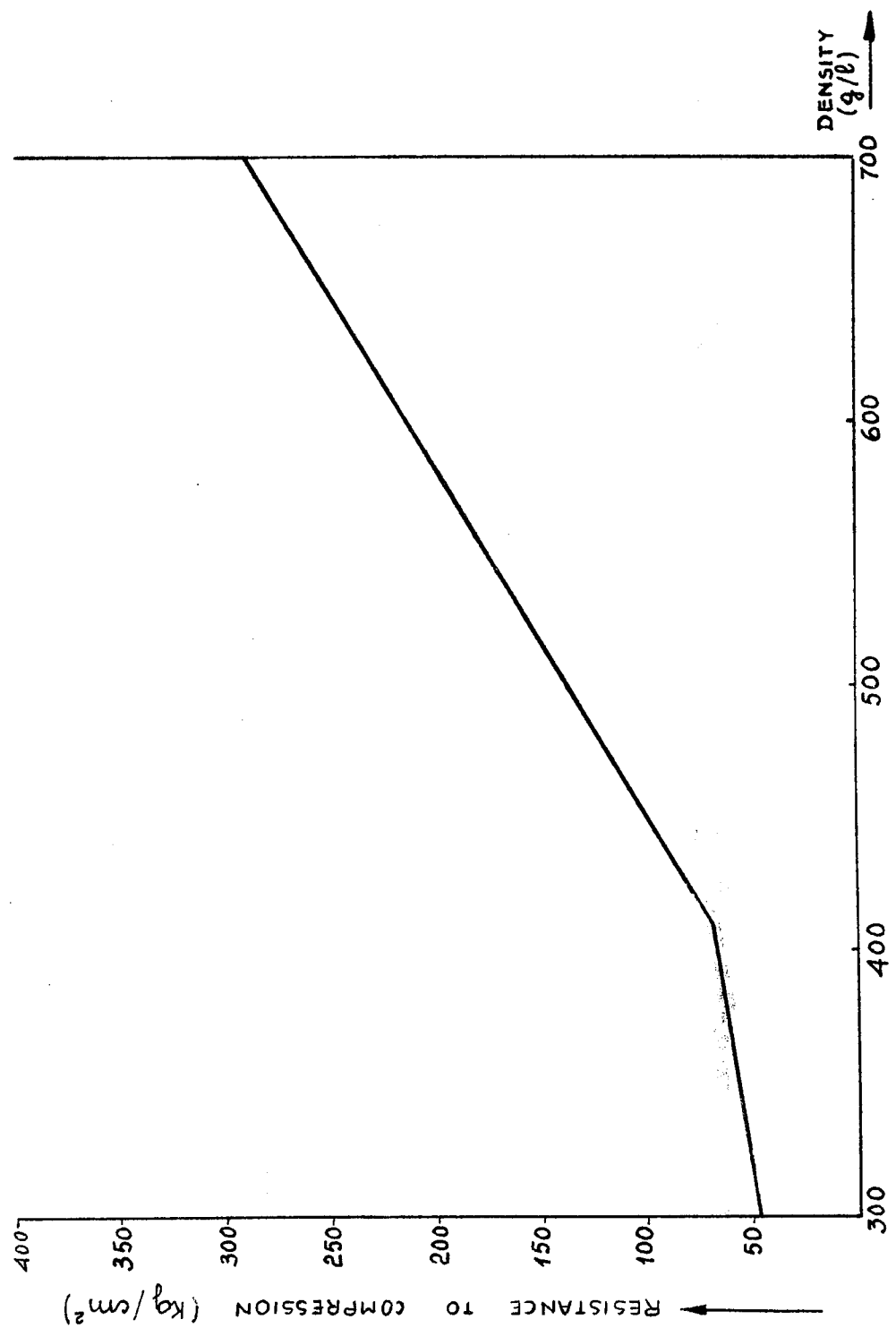

PROCESS FOR OBTAINING PERMANENTLY SELF-EXTINGUISHING CELLULAR MATERIALS WHICH HAVE A LOW DENSITY AND HIGH MECHANICAL CHARACTERISTICS

BACKGROUND OF THE INVENTION

1. Field of the Invention

The present invention refers to a process for obtaining permanently self-extinguishing cellular materials, which have a low density and high mechanical characteristics. More particularly the present invention refers to a process for obtaining cellular materials, characterized by permanent self-extinguishing properties and by low density correlated with high mechanical characteristics, by mechanical foaming of particular brominated unsaturated polyester resins. The present invention further refers to the cellular materials thus prepared, as well as to products obtained from said cellular materials.

2. Prior Art

Cellular materials essentially comprising unsaturated polyester resins having a low density are already known in the art. They are normally obtained starting from a composition of matter comprising liquid unsaturated polyester resins and various additives such as cross-linking agents, antioxidants, surfactants, foams stabilizers, nucleating agents, cell dimensions controlling agents, etc. According to the known art said compositions of matter are formed until low density liquid foams are obtained. Said foaming is carried out either by mechanical incorporation of air or other gases, or by the foaming action of expanding liquids, i.e. low boiling substances which are brought to a temperature above their boiling point, or by addition of chemical compounds which decompose when heated or as a consequence of chemical reactions, whereby to evolve gases which remains entrapped within the liquid resin.

Said liquid foams are transformed, still according to the known art, into solid cellular materials by crosslinking by means of crosslinking agents incorporated for this purpose in the starting resin.

Said cellular materials may have a density within a broad range from about 1 kg per liter to 10 gr per liter, according to the foaming method and the amount of foaming agent introduced.

The mechanical characteristics of such foams, in particular their resistance to compression, considerably vary as a function of the density, and increase as the density of the cellular material increases. Thus, it is desired to obtain possibly low density, so as to reduce the specific costs of the material and to improve the characteristics of resistance to the transmission of sound and of heat, i.e. of sound and heat insulation. In order to obtain cellular materials having high resistance to compression, in particular a resistance higher than 50 kg per $cm^2$, but a density which is low enough to obtain the aforesaid characteristics, it is necessary to adopt a compromise between the density of the cellular material and its resistance to compression. For practical purposes, however, only cellular materials having densities below 700 gr per liter and above 300 gr per liter, to which FIG. 1 refers, are of interest. To achieve an optimal balance of the aforesaid desirable properties, it is necessary to select particular types of unsaturated polyester resin.

The solid cellular materials made of conventional unsaturated polyester resin do not have self-extinguishing characteristics, i.e. if they are subjected e.g. to a self-extinguishing test according to norm ASTM 3014-74, which requires the application of a flame under the tested material for a period of time of 10 seconds, once said flame has been removed said cellular materials will continue to burn until the portion positioned above the flame has been completely or almost completely destroyed. For such reason cellular materials of this type may be defined as non-self-extinguishing. In order to pass the aforesaid self-extinguishing test, a material should spontaneously cease to burn, either immediately, or within three seconds at the most, once the priming flame has been removed. It is also required for the practical uses of the products possessing self-extinguishing properties, that said properties be permanent, i.e. that they remain unaltered with the passing of time even if the product is employed at a temperature higher than room temperature but anyway not higher than 100° C.

Cellular materials essentially comprising unsaturated polyester resins characterized by permanent self-extinguishing properties, by a density comprised between 300 and 700 gr per liter, and by a resistance to compression higher than 50 kg per $cm^2$, are now required in various industrial sectors for safety reasons. Industrial sectors in which said products are particularly required are the electrotechnical, building and transport vehicles (aircrafts, railway wagons or coaches motorcars) sectors.

Permanently self-extinguishing cellular materials of the type of those which are the object of the present invention, are new in the art since any self-extinguishing cellular materials which have been made, have either self-extinguishing characteristics which are not permanent but decrease in time during their use, or a density which is too high for their intended uses or their compression resistance to density relationship does not correspond to the above specified required values.

Thus, for instance, one of the known method for obtaining permanently self-extinguishing materials essentially comprising unsaturated polyester resins comprises the addition of finely particulated trihydrated alumina. If a product which contains a sufficient amount (more than 40% by weight of the product) of trihydrated alumina is exposed to a fire, it exhibits self-extinguishing characteristics thanks to the fact that it liberates water from the trihydrated alumina, which water moderates the temperature increase due to the external fire. Because of the high specific weight of the trihydrated alumina (2.42 kg per liter), which is much higher than that of the conventional unsaturated polyester resins (about 1.2 kg per liter) the permanently self-extinguishing cellular materials thus obtained, have an excessively high density, and anyway not lower than 650 gr per liter, unless the amount of resin used per liter of cellular material is considerably reduced, whereby the resistance to compression is lowered to values below those acceptable for the aforesaid practical use.

Another way of obtaining self-extinguishing cellular materials essentially comprising unsaturated polyester resins, consists in adding to the resin a sufficient amount of halogenated organic compounds, such as e.g. decabromo-diphenyloxide or pentabromo-ethylbenzene. However, in order to obtain the above specified self-extinguishing characteristics, it is necessary in this case to add at least 25% by weight of said brominated compounds. However, if is desired to use said additives when foaming by mechanical gas incorporation, which is the foaming method used in the present invention, it is difficult, if not impossible, to obtain densities lower than the required upper density limit that is lower than 700 gr per liter, because of the considerable amounts of said additives necessary to obtain self-extinguishing properties, because of the high specific density of the brominated organic additives, and because of the mechanical difficulties created by the presence of high quantities of solid or semi-solid additives during the foaming process. Even in the extreme case in which self-extinguishing cellular materials having a sufficiently low density could be obtained with said additives, their self-extinguishing properties would disappear with the passing of time, because of the migration of the brominated additive to the surface and its subsequent loss due to mechanical abrasion. In this way the cellular material exhibits, after a sufficiently long time, self-extinguishing properties which are too low and therefore practically no longer adequate to the practical use, and this all the more if the cellular product is employed at a temperature that is substantially higher than room temperature.

Some partially self-extinguishing cellular materials essentially comprising polyester resins, obtained by chemical foaming or by means of volatile expanding agents, are known in the art. In this case "chemical foaming" means the formation of gas within the resin due to chemical reaction, such as e.g. the decomposition of a chemical agent or due to the reaction of a chemical agent with certain functional groups of the resin. Both the chemical foaming and the foaming effected by means of volatile expanding agents (e.g. fluorinated hydrocarbons) lead, however, to considerable drawbacks, which are e.g. high cost of the chemical or expanding agents, toxicity thereof, air pollution (in the case of fluorinated hydrocarbons), instability of the chemical agent which needs to be stored at low temperature.

SUMMARY OF THE INVENTION

It has now been surprisingly found by the Applicant that it is possible to obtain, by means of mechanical foaming of brominated unsaturated polyester resins, permanently self-extinguishing cellular materials which have a density lower than 700 gr per liter, correlated to a resistance to compression of the product higher than 50 kg/cm$^2$, even without reinforcement by means of fibrous material and without the creation of sandwich multilayer structures.

The unsaturated polyester resins which have been surprisingly found to be particularly adapted for obtaining the cellular materials, which are one of the objects of the present invention, may be obtained e.g. from particular alkyds containing sufficiently high amounts of tetrahydrophthalic anhydride which has been brominated by reaction with bromine.

In order to obtain the aforesaid resins, the brominated alkyds are dissolved in styrene. To be adapted for the purposes of the present invention, said resins must contain an amount of chemically bound bromine comprised between 10 and 30% by weight, preferably between 12 and 25% by weight.

An object of the present invention is therefore a process for the preparation of permanently self-extinguishing cellular materials essentially comprising brominated unsaturated polyester resins, having a density below 700 g/l, correlated to a resistance to compression of the product higher than 50 kg per cm$^2$, according to the graph of FIG. 1, said process being characterized by the fact that a brominated unsaturated polyester resin (preferably obtained by bromination of an alkyd which contains units derived from tethrahydrophthalic anhydride in its chains in an amount higher than 20% by weight of the alkyd and by successive dilution with styrene and/or vinyltoluene), containing an amount of bound bromine comprised between 10 and 30%, preferably between 12 and 25% by weight, to which suitable crosslinking agents, one or more surface active agents, foam stabilizers and/or dimension controlling agents have been added, is foamed by mechanical incorporation of a gas or a mixture of gases, until liquid crosslinkable foams have been obtained, which latter are subsequently subjected to crosslinking by conventional methods.

DETAILED DESCRIPTION OF THE PREFERRED EMBODIMENTS

Crosslinking agents or systems which are preferably employed according to the present invention, are therefore of peroxidic type, such as benzoyl peroxide alone or in combination with N-dialkyl substituted aromatic amines, commercial mixtures of peroxides and hydroperoxides of ketones such as e.g. those of cyclohexanone, acetone and methylethylketone in combination with accelerators. The mixtures of peroxides and hydroperoxides of methylethylketone, in combination with cobalt naphthenates, octoates or other salts, are particularly preferred.

As surface active agents, foam stabilizers and cell dimension controlling agents, there may be employed according to the present invention, those conventionally used for such purposes, and more precisely those based on silicon oils. Optionally, if required, other conventional additives may be added to the brominated unsaturated polyester resins, such as antioxidants, stabilizers, pigments and/or reinforcing and non-reinforcing fillers.

The operations which characterize the preparation of the cellular materials essentially comprising permanently self-extinguishing brominated unsaturated polyester resins, having densities below 700 gr per liter and having resistances to compression as above specified when in the pure and non-reinforced state, comprise:

1. The resin is violently agitated, whereby to incorporate therein an amount of gas sufficient to produce the required densities lower than 700 gr per liter. High speed mechanical agitators, rotary whips, turbines, ejectors and any other device which assures a violent mixing of gas and liquid, may be conveniently used for this purpose.

2. The liquid foam obtained as described in item 1, is crosslinked by means of the above specified previously incorporated catalytic system or, e.g. if diisocyanates are used, by means of the chemical reaction of this latter with the resin components. The crosslinking may caused to occur at room temperature or in the hot, by suitably choosing the catalytic system and its amount with respect to the resin. The crosslinking in the hot shortens the crosslinking time, but may in the same cases cause drawbacks, such as the cracking of the cellular material.

3. In order to confer to the cellular materials thus obtained the form of a product, the crosslinking described in item 2 may be effected in a closed or open mould, into which the liquid foam has been poured or injected by means of a pump, or it may be effected under pressure in closed moulds. Said crosslinking, for obtaining the product, may also be carried out in mobile devices, so as to operate continuously, in this case too by pouring or by spraying through suitable ejectors.

Obviously, without departing from the scope of the invention, it is possible to add to the above specified brominated unsaturated polyester resins, before, during or after the mechanical foaming, reinforcing materials, preferably glass fibers, which, though on the one hand they undesirably increase the density of the cellular material, on the other hand improve certain mechanical characteristics thereof, in particular resistance to traction to bending and to impact. The fact that permanently self-extinguishing low density cellular materials are obtained from the aforesaid particular brominated unsaturated polyester resins is all the more surprising as it was not predictable, because of the high specific weight of the derivatives which contain high quantities of bromine. Further, and this is even more surprising, neither was it predictable, because of the high viscosity of the unsaturated polyester resins which contain bromine in their polymeric chains, that amounts of gas sufficient to obtain the low densities required by the practical use could be incorporated by mechanical incorporation.

The permanent self-extinguishing action may also be obtained from a combination of the above specified brominated resins with the addition, during or after mechanical foaming, of limited amount of a self-extinguishing solid additive, such as e.g. trihydrated alumina.

Thus, for instance, it is possible to use the said brominated resins in combination with an equal weight of conventional unbrominated unsaturated polyester resin and with finely divided trihydrated alumina in an amount of 20% by weight of the total. In this case the limited amount of trihydrated alumina does not prevent obtaining sufficiently low densities of the cellular material and a sufficiently high resistance to compression.

A further object of the present invention are the permanently self-extinguishing cellular materials essentially comprising brominated unsaturated polyester resins containing an amount of bound bromine between 10 and 30%, preferably between 12 and 25% by weight, said cellular materials being characterized by the fact that:

(a) they are obtained by mechanical incorporation of a gas;
(b) they have a density below 700 gr per liter, preferably comprised between 300 and 700 gr per liter;
(c) they have a resistance to compression, as formed products above 50 kg per cm$^2$; the values of items (b) and (c) being correlated the one to the other according to the graph of the attached FIG. 1.

According to the present invention, the self-extinguishing cellular materials not containing fillers have values of density and resistance to compression defining points located on the line shown in said graph or positioned above it. More particularly, if the density is 650 gr per liter, the cellular materials according to the invention have a resistance to compression exceeding 250 kg/cm$^2$; if the density is 500 gr per liter, the resistance to compression of said materials exceeds 135 kg/cm$^2$; if the density is 400 gr per liter, the resistance to compression exceeds 70 kg/cm$^2$; if the density is 300 gr per liter, the resistance to compression exceeds 50 kg/cm$^2$ the values of the resistance to compression varying analogously for intermediate density values, according to the graph of FIG. 1.

The products obtained from the above defined cellular materials are also an object of the present invention.

The drawing describes the relationship between density and resistance to compression of the permanently self-extinguishing cellular materials not containing fillers essentially comprising unsaturated polyester resins, according to the present invention.

The following examples have the purpose of illustrating the invention but do not limit its scope.

EXAMPLE 1

Unsaturated polyester resin is prepared in the following way: 114 parts by weight of propylene glycol, 130 parts by weight of tetrahydrophthalic anhydride, 56 parts by weight of maleic anhydride, 30 parts by weight of xylene and 0.06 parts by weight of hydroquinone, are charged into a AISI 316 steel reactor provided with a port for the introduction of the reagents, a vane stirrer with an antideflagrating motor, a steam heating jacket, a condenser and a condensate reflux syphon. The reactor is heated to 160° C. under stirring and while passing a nitrogen stream through it. The polycondensation begins with the evolution of water, which is entrained out of the reactor, together with the xylene, by the nitrogen stream. The condensed xylene is continuously refluxed to the reactor. The temperature is then gradually brought to 220° C. and is maintained unchanged until the acid number has decreased to 40, eliminating all the condensed xylene. At this point the reactor is allowed to cool down. The product is discharged, while still liquid, into a container in which it is solidified. It is crushed and dissolved into an equal weight of methylene chloride and the solution is discharged into an enameled reactor provided with a stirrer, a cooling and heating jacket, a condenser and a port for introducing the reagents. 0.5 kg bromine for each kg of polyester are added within a period of 10 hours, taking care that the reaction temperatures does not exceed 30° C. When all the bromine has been added, steam is introduced into the reactor jacket and all the methylene chloride is distilled.

A brominated and saturated polyester is thus obtained, which is dissolved in styrene under stirring with a 2:1 weight ratio of brominated polyester to styrene, and to which 0.05% of hydroquinone is added. A resin having a chemically bound bromine content of 21.6% is thus obtained.

To a portion of said resin, a catalytic system is added consisting of 1.2% by weight of a mixture of methylethylketone peroxide and hydroperoxide and of 0.5% by weight of a 6% cobalt octoate solution, as well as a commercial surface active agent in an amount of 1% parts by weight, and the resin is foamed in 20 minutes by means of a whip rotating at a speed of 500–1000 revolutions per minute, while concurrently bubbling nitrogen from below into the vessel in which the foaming takes place. The obtained liquid foam is poured into an open mould and maintained at room temperature. After 10 minutes, the gel time is reached; after another 10 minutes, the material has hardened and is removed from the mould. The density of the cellular material is 440 gr per liter, its resistance to compression is 136 kg per cm$^2$. A sample of the product is subjected to the self-extinguishing test, according to norm ASTM D 3014–74: after 10 seconds, during which the product is subjected to the action of a flame, this latter is removed. The fire caused by the flame becomes immediately extinguished.

EXAMPLE 2

The same resin described in example 1 is used. 20% by weight of trihydrated alumina are added, besides the additives described in example 1. By operating as in example 1, a cellular material is obtained which has a density of 650 grams per liter and a resistance to compression of 250 kg per cm$^2$.

EXAMPLE 3

A mixture of 50 parts of resin prepared as in example 1 and 50 parts of commercial polyester resin is used, while leaving the other components and the process for obtaining the foam, unchanged. A foam is obtained having characteristics which vary according to the polyester resin employed.

EXAMPLE 4

The operations of example 1 are repeated but the period of agitation is decreased from 20 to 10 minutes. After hardening of the obtain liquid foam in a closed mould, a self-extinguishing cellular product is obtained having a density of 650 g/l and a resistance to compression of 380 kg/cm$^2$.

We claim:

1. Permanently self-extinguishing cellular materials consisting essentially of brominated unsaturated polyester resins containing an amount of bound bromine of between 10 and 30%, said cellular materials being characterized in that
   (a) they have been obtained by mechanical incorporation of gas into a brominated unsaturated polyester resin prepared by bromination of an alkyd, containing units derived from tetra-hydrophthalic anhydride in its chains in an amount higher than 20% by weight of the alkyd, and by subsequent dilution with styrene and/or vinyltoluene, until cross-linkable liquid foams are obtained, which latter foams are subsequently subjected to cross-linking;
   (b) they have a density below 700 grams per liter; and
   (c) they have a resistance to compression, as a formed product, higher than 50 kg per cm$^2$, correlated to the density according to the attached FIG. 1.

2. Cellular materials according to claim 1, characterized that in the case of a density of 650 gr per liter, the cellular materials have a resistance to compression higher than 250 kg per cm$^2$.

3. Cellular materials according to claim 1, characterized that in the case of a density of 500 gr per liter, the resistance to compression of the cellular materials exceed 135 kg/cm$^2$.

4. Cellular materials according to claim 1, characterized that in the case of a density of 300 gr per liter, the resistance to compression of the cellular materials exceed 50 kg/cm$^2$.

5. Cellular materials according to claim 1 in which the amount of bound bromine in the brominated unsaturated polyester resins is between 12 and 25%.

6. Cellular materials according to claim 1 in which the density of the cellular materials is between 300 and 700 gr per liter.

* * * * *